United States Patent [19]
Jensen et al.

[11] Patent Number: 5,007,781
[45] Date of Patent: Apr. 16, 1991

[54] TAPERED SPLIT-BUSHING FASTENER

[75] Inventors: Jack E. Jensen; Ebrahim Parekh, both of San Diego, Calif.

[73] Assignee: General Dynamics Corporation, Convair Division, San Diego, Calif.

[21] Appl. No.: 580,016

[22] Filed: Sep. 10, 1990

[51] Int. Cl.$^5$ .............................................. F16B 21/00
[52] U.S. Cl. .................................... 411/337; 411/354; 411/904
[58] Field of Search ............... 411/361, 904, 918, 511, 411/337, 354, 258, 82, 376, 257, 337

[56] References Cited

U.S. PATENT DOCUMENTS

| | | | |
|---|---|---|---|
| 1,476,491 | 12/1923 | Coles | 411/500 |
| 1,692,565 | 11/1928 | Paul | 411/354 X |
| 1,913,408 | 6/1933 | Paul | 411/354 |
| 2,463,185 | 3/1949 | Kremer | 411/500 |
| 4,687,394 | 8/1987 | Berecz | 411/361 |
| 4,834,603 | 5/1989 | Holton | 411/521 |
| 4,846,614 | 7/1989 | Steinbock | 411/432 X |
| 4,861,211 | 8/1989 | Dunsmore | 411/361 X |
| 4,923,225 | 5/1990 | Luhrsen et al. | 411/258 X |

FOREIGN PATENT DOCUMENTS 783579 9/1957 United Kingdom ............... 411/258

*Primary Examiner*—Rodney M. Lindsey
*Attorney, Agent, or Firm*—John R. Duncan; Frank D. Gilliam

[57] ABSTRACT

The tapered split-bushing fastener has been designed for high temperature applications. The fastener consists of a pin (with a standard countersunk head at one end and a tapered end at the other end), a split tapered bushing, a washer and a sleeve with an internal taper. Installation is accomplished by inserting the pin in the parts to be fastened, then slipping the washer and the split bushing on the tapered end and finally pushing the sleeve onto the split bushing. Pushing the sleeve causes the split-bushing to react against the washer and generate the fastener axial preload. A high temperature adhesive is then injected to lock the fastener in place.

6 Claims, 1 Drawing Sheet

TAPERED SPLIT-BUSHING FASTENER

BACKGROUND OF THE INVENTION

The present invention relates to fasteners and more specifically to one that has adequate strength and oxidation resistance at high temperatures.

Presently conventional threaded fasteners cannot be used for high temperature applications because most fastener materials do not have adequate strength or oxidation resistance at high temperatures. The temperature resistant materials (like carbon-carbon composites) do not lend themselves to thread machining due to the material structure (thread machining yields threads with low shear strength). An example of an application requiring fasteners to be used in a high temperature environment would be those used on hypersonic vehicle structures.

It is an object of the invention to provide a novel tapered split-bushing fastener that can be used in high temperature applications.

It is also an object of the invention to provide a novel tapered split-bushing fastener that does not require thread machining and which can use temperature resistant materials such as ceramic and carbon-carbon composites.

It is another object of the invention to provide a novel tapered split-bushing fastener that can be easily installed through aligned apertures in the parts to be fastened together and which can be locked in position by a high temperature adhesive.

It is further object of the invention to provide a novel tapered split-bushing fastener that can be used on hypersonic vehicle structures.

SUMMARY OF THE INVENTION

The novel tapered split-bushing fastener has been designed for use in high temperature applications such as on hypersonic vehicle structures. The fastener utilizes a tapered wedge connection instead of threads. The fastener consists of a pin having a head portion, a shank portion and a tapered end portion. The head portion has a standard countersunk head. The tapered end portion is tapered from its distal end toward the head. A split-bushing matingly surrounds the tapered distal end portion. A tubular sleeve matingly surrounds the split bushing. A washer is mounted on the shank portion of the pin for length adjustment and fit.

Installation is accomplished by inserting the pin in the parts to be fastened, then slipping the washer and the split-bushing on the tapered end of the pin.

Next the tubular sleeve is pushed on to the split-bushing while the pin is held in place. Pushing the tubular sleeve causes the split-bushing to react against the washer and generates the fastener axial preload. A high temperature adhesive is then injected through an injection port in the tubular sleeve and it travels to an annular groove on the interior of the tubular sleeve to lock the tubular sleeve and fastener in place.

For high temperature applications the novel fastener can be made from temperature resistant materials such as ceramic or carbon-carbon composites. There are other applications for the fastener in which the components may be made out of metallic material and retained in locked position by clinching.

DESCRIPTION OF THE PREFERRED EMBODIMENT

Figure 1:
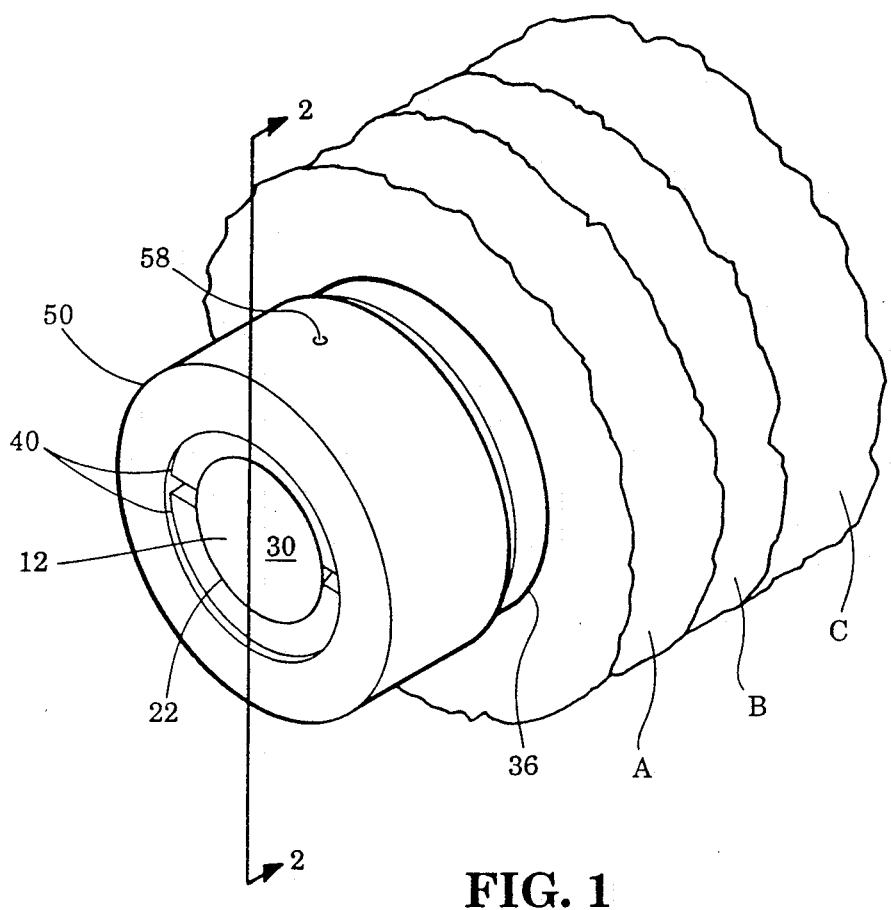
FIG. 1 is a front perspective view illustrating the novel tapered split bushing fastener securing three parts together.
Figure 3:
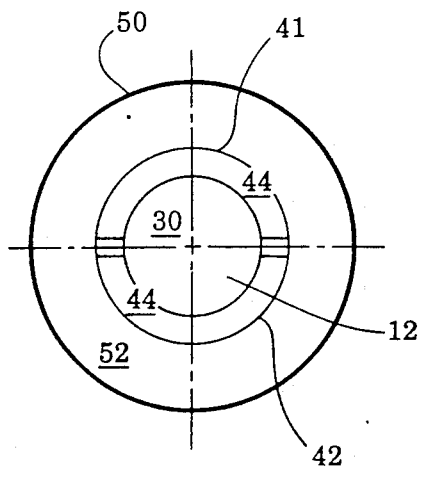
FIG. 3 is a front elevation view of the novel tapered split-bushing fastener in assembled state.
Figure 2:
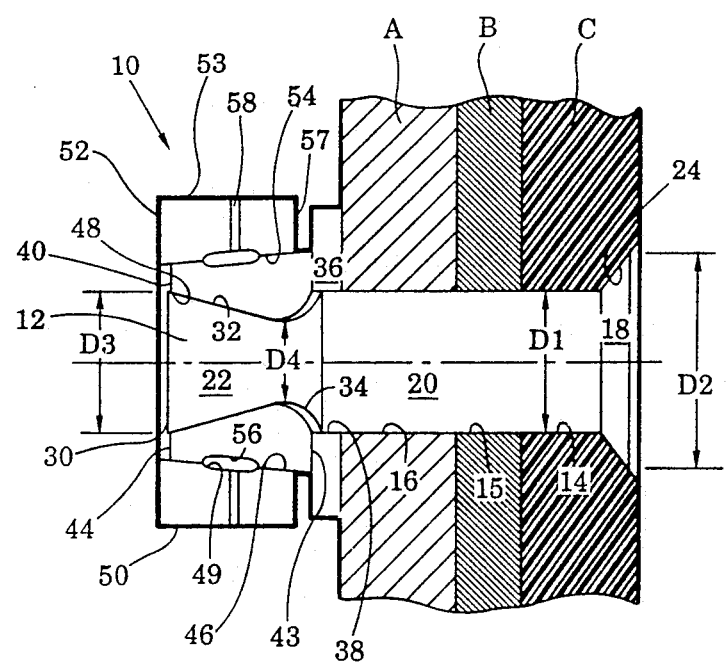
FIG. 2 is a cross sectional view taken along lines 2—2 of FIG. 1.

Applicant's novel tapered split-bushing fastener will now be described by referring to FIGS. 1-3. The tapered split-bushing fastener is generally designated numeral 10.

In the example illustrated, parts A, B, and C are fastened together by tapered split-bushing fastener 10. The fastener has a pin 12 that is inserted through aligned apertures 14, 15, and 16 in the respective parts C, B, and A.

Pin 12 has a head portion 18, a shank portion 20 and a tapered end portion 22. Head portion 18 is configured in the shape of a countersunk head 24. It has a diameter D2. Shank portion 20 has a diameter D1. Tapered end portion 22 has an end 30 whose diameter is D3. The diameter of tapered portion 22 tapers from its rear end forwardly toward the head 18 in the manner of an annular tapered recess 32. It has a diameter D4 at its narrowest point. It has an annular curved surface 34 where it returns to a diameter D1. A washer 36 has a bore hole 38.

Split-bushing 40 has two halves 41 and 42. It has a front end surface 43 and a rear end 44. It also has a tapered outer side wall 46 and a tapered inner side wall 48. An annular groove 56 is formed in tapered outer side wall 46.

Tubular sleeve 50 has a front end 57, a rear end 52, an outer side wall 53 and a tapered bore 54. An annular groove 56 formed in the surface of split-bushing 40 is formed in the surface of tapered bore 54 of tubular sleeve 50 and it aligns with annular groove 56. An injection port 58 passes radially through tubular sleeve 50 and its inner end is in communication with the respective aligned annular grooves 49 and 56 so that an adhesive may be injected into their mating cavities and hardened in order to form a key and in order to lock them in a holding position.

What is claimed is:

1. A tapered split-bushing fastener comprising:
  an elongated smooth pin having a predetermined length, said pin having a front end and a rear end;
  in sequence from its front end to its rear end, said pin has a head portion, a shank portion and a rear portion;
  said shank portion having an outer diameter D1, said head portion having a diameter D2 that is greater than D1;
  said rear end portion having an outer diameter D3 that is no greater than D1 and it tapers axially forwardly from its rear end to a diameter D4 that is less than D1 by a predetermined amount;
  a tubular split-bushing having a front end, a rear end, and inner annular surface and an outer annular surface, said bushing being split longitudinally into at least two pieces, said outer annular surface of said tubular split-bushing having a first circumferential annular groove therearound;

said tubular split-bushing being removably engagable around the tapered surface of the rear portion of said pin;

a tubular sleeve having a front end, a rear end and a lateral outer side wall;

said tubular sleeve having a bore hole that extends from its front end to its rear end, said bore hole having a second circumferential annular groove therearound and said bore hole matingly engages the outer annular surface of said split-bushing and said first and second circumferential annular grooves align to forming a closed chamber thereby; and means for substantially filling said closed chamber with an adhesive for locking said tubular sleeve on said split-bushing so that neither of them can be removed from the rear end portion of said elongated pin.

2. A tapered split-bushing fastener as recited in claim 1 wherein said means for substantially filling said closed chamber with an adhesive for locking said tubular sleeve on said split-bushing further comprises at least one injection port extending from the outer lateral side wall of said tubular sleeve to said closed chamber for transmitting said adhesive into said closed chamber.

3. A tapered split-bushing fastener as recited in claim 1 further comprising a washer having a bore hole whose diameter is at least as great as D1 and it is removably received on the shank portion of said pin.

4. A tapered split-bushing fastener as recited in claim 1 wherein said pin, split-bushing and tubular sleeve are all made of ceramic material.

5. A tapered split-bushing fastener as recited in claim 1 wherein said pin, split-bushing and tubular sleeve are all made of carbon-carbon composites.

6. A tapered split-bushing fastener as recited in claim 1 wherein said head portion of said pin has a countersunk head configuration.

* * * * *